(12) United States Patent
Holen et al.

(10) Patent No.: US 6,193,216 B1
(45) Date of Patent: Feb. 27, 2001

(54) PULLING DEVICE FOR ELONGATED ARTICLES

(75) Inventors: Petter Tomas Holen, Kløfta; Jan Erik Karlsen, Kolbotn, both of (NO)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/233,122

(22) Filed: Jan. 19, 1999

(30) Foreign Application Priority Data

Jan. 21, 1998 (NO) ................................................ 19980270

(51) Int. Cl.[7] .................................................... E21C 29/16
(52) U.S. Cl. ............................................ 254/134.3 FT
(58) Field of Search ................................. 254/134.3 FT, 254/134.4, 134.3 R, 134.5; 15/104.33, 104.32, 104.31

(56) References Cited

U.S. PATENT DOCUMENTS

| | | | |
|---|---|---|---|
| 2,980,399 | * | 4/1961 | Littlefield ........................... 254/134.4 |
| 4,050,384 | * | 9/1977 | Chapman ............................ 254/134.5 |
| 4,083,533 | * | 4/1978 | Schwabe ............................. 254/134.4 |
| 4,411,409 | * | 10/1983 | Smith ............................ 254/134.3 FT |
| 4,552,338 | * | 11/1985 | Lindgren ....................... 254/134.3 FT |
| 4,715,747 | * | 12/1987 | Behrens ............................. 254/134.4 |

FOREIGN PATENT DOCUMENTS 23 30 844 A1   1/1975  (DE).

* cited by examiner

*Primary Examiner*—Robert C. Watson
(74) *Attorney, Agent, or Firm*—Sughrue, Mion, Zinn, Macpeak & Seas, PLLC

(57) ABSTRACT

The present invention relates to an apparatus means for pulling an elongated article (3) through a curved tube (1),—such as the lower portion of a J-tube where the pulled end of the article is provided with a rigid installation head (2). The pulling apparatus includes a rod and ball device (5), the rod (6) being inserted through the ball (7) so that the rod extends from both sides of the ball,—one end (8) of the rod being attached to the head,—and the other end (9) of the rod being attached to a pulling wire (4).

7 Claims, 1 Drawing Sheet

FIGURE
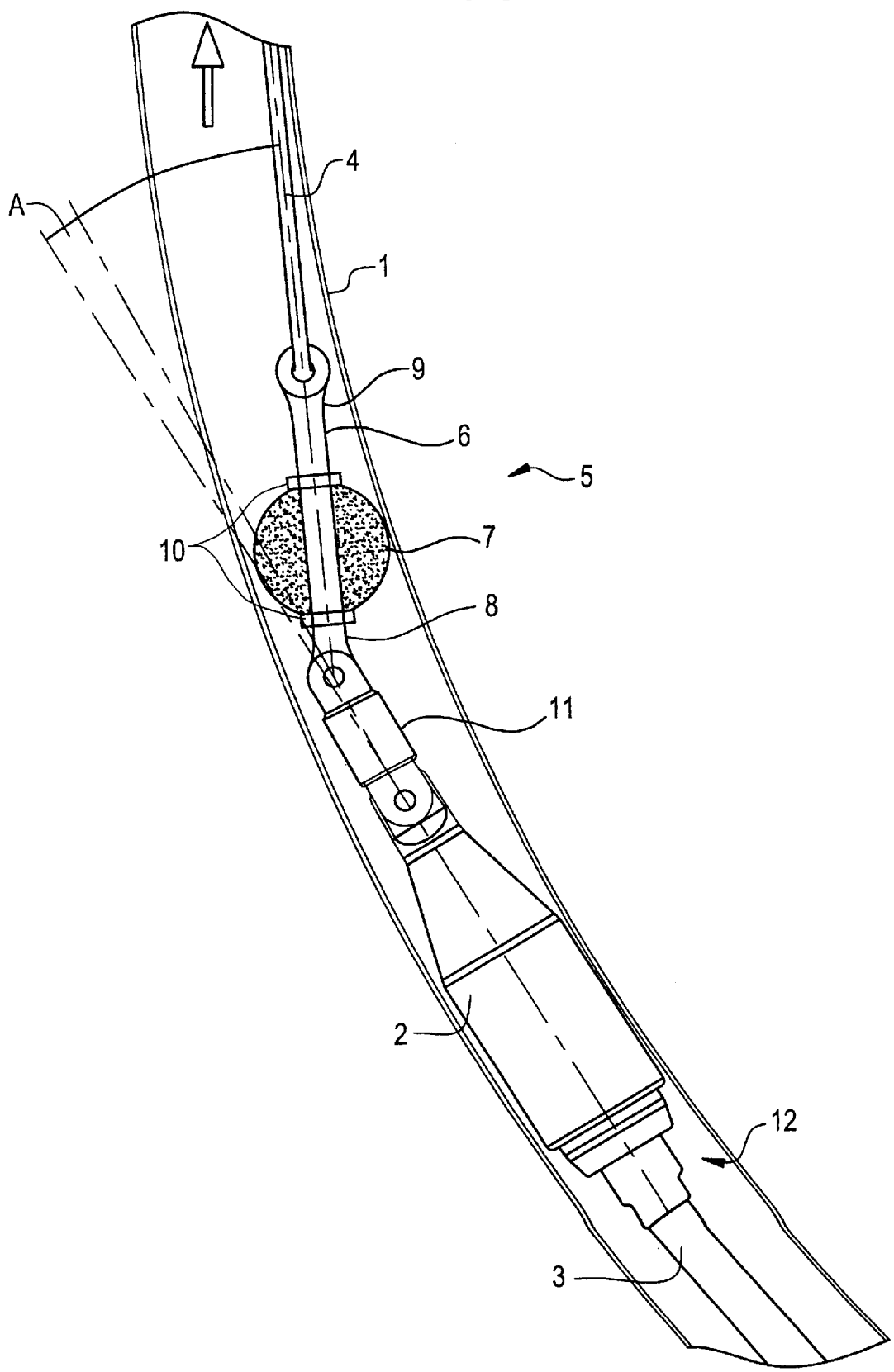

PULLING DEVICE FOR ELONGATED ARTICLES

BACKGROUND OF THE INVENTION

The present invention relates to means for pulling an elongated article—such as a cable, an umbilical or a pipeline—through a curved tube,—such as through the lower portion of an offshore J-tube leading from the sea bed to a surface construction, when the pulled end of the article is provided with a rigid installation head.

A pulling wire is usually attached directly to the end of the installation head and the normal pulling procedures often cause undue bending and friction damages to the head.

U.S. Pat. No. 1,672,324 describes a wire threading leader and coupler. The leader may be provided with rollers to reduce the friction between the leader and the tube walls.

U.S. Pat. No. 2,532,504 relates to a method and apparatus for installing electric cable systems. A plurality of cable conductors are connected to a pulling wire via a torque release device, a guiding, spiralling and twisting device and a swivel. The twisting device is provided with a number of friction wheels which ensures rotation of the cables.

The mentioned methods and apparatus are not suitable for the task of pulling an elongated article with a rigid installation head through a curved tube. Such a head may typically have a diameter of 150–300 mm and a length of 500–1000 mm. The diameter and radius of the J-tube can be respectively 10"–16" and 5–30 m.

SUMMARY OF THE INVENTION

The object of the invention is improve the pulling technique and avoid damage and undue tensions on the installation head.

The inventions ensures that the article head is pulled through the curved tube along its longitudinal axis, and that damage and undue bending is avoided in the critical zone at the transition between the article and the head.

BRIEF DESCRIPTION OF THE DRAWING

Above mentioned and other features and objects of the present invention will clearly appear from the following detailed description of embodiments of the invention taken in conjunction with the drawing illustrating a pulling arrangement.

BRIEF DESCRIPTION OF THE INVENTION

In the figure is schematically illustrated a curved portion of a J-tube 1, a termination head 2 attached to an elongated article 3 and a pulling wire 4.

The pulling means includes a rod and ball device 5 which includes a rod 6 which is inserted through a ball 7 so that the rod extends from both sides of the ball. One end 8 of the rod 6 is attached to the head 2,—and the other end 9 of the rod 6 is attached to the pulling wire 4.

The length of rod extending from each side of the ball is decided from the diameter and curvature of the curved tube. When these lengths have been decided the position of the ball on the rod is fixed with nuts 10. The ball may be rotatable on the rod and be made of steel or reinforced polymers. The diameter of the ball can be some 80–90% of the inner diameter of the tube.

A swivel device 11 may be inserted between the head 2 and the pulling device 5.

The above detailed description of embodiments of this invention must be taken as examples only and should not be considered as limitations on the scope of protection.

The angle A between the head axis and the head pulling direction should be as small as possible—preferably less than 3°, in order to avoid undue bending in the critical zone 12 between the article 3 and its head 2.

What is claimed is:

1. An apparatus for pulling an elongated article from one end through a curved tube, such as a J-tube at a lower portion thereof, where the pulled end of the article is provided with a rigid installation head, comprising:

a rod and ball device, the rod being inserted through the ball so that the rod extends from both sides of the ball, and one end of the rod being attached to the head, and a pulling wire attached to the other end of the rode;

wherein a position on the ball is fixed with nuts.

2. The pulling apparatus according to claim 1, wherein a length of the rod extending from each side of the ball is determined from a diameter a curvature of the curved tube.

3. The pulling apparatus according to claim 1, wherein a diameter of the ball is 80–90% of an inner diameter of the tube.

4. The pulling apparatus according to claim 1, further comprising a swivel device connecting said rod and ball device and said head.

5. The pulling apparatus according to claim 1, wherein the ball is rotatable on the rod.

6. The pulling apparatus according to claim 1, wherein the ball is made of one of steel and reinforced polymers.

7. The pulling apparatus according to claim 1, wherein an angle between an axis of the head and a pulling direction of the head is less than three degrees.

* * * * *